United States Patent
Cheng (10) Patent No.: US 6,443,377 B1
(45) Date of Patent: Sep. 3, 2002

(54) PEPPER MILL

(76) Inventor: Shun-I Cheng, No. 595, Section 2, Chang-Shi Street, Tainan City (TW)

( * ) Notice: Subject to any disclaimer, the term of this patent is extended or adjusted under 35 U.S.C. 154(b) by 17 days.

(21) Appl. No.: 09/793,615

(22) Filed: Feb. 27, 2001

(51) Int. Cl.[7] .............................................. A47J 42/04
(52) U.S. Cl. .................................................. 241/169.1
(58) Field of Search .............................. 241/169.1, 168, 241/286

(56) References Cited

U.S. PATENT DOCUMENTS

| | | | | |
|---|---|---|---|---|
| 5,180,114 A | * | 1/1993 | Chen | 241/169.1 |
| 5,865,384 A | * | 2/1999 | Pai | 241/101.3 |
| 6,196,481 B1 | * | 3/2001 | Barbagli | 241/30 |

* cited by examiner

*Primary Examiner*—Mark Rosenbaum
(74) *Attorney, Agent, or Firm*—Rosenberg, Klein & Lee (57) ABSTRACT

A pepper mill includes a base with a fixed member connected therein and a grinder 26 rotatably received in the fixed member. An end collar is connected to a bottom of the base and serrated teeth defined in a top edge of the end collar. A disk is rotatably mounted to the end collar and has protrusions movably engaged with the serrated teeth. A top member is mounted to a top of the base and a bottle is connected to the top member. The top member has a shaft which securely engaged with the grinder and a spring is mounted to the shat and biased between the grinder and the top member. The gap between the fixed member and the grinder can be adjusted by rotating the end collar.

3 Claims, 9 Drawing Sheets

PEPPER MILL

FIELD OF THE INVENTION

The present invention relates to a pepper mill that can be adjusted to have different sizes of pepper particles.

BACKGROUND OF THE INVENTION

Figure 7:
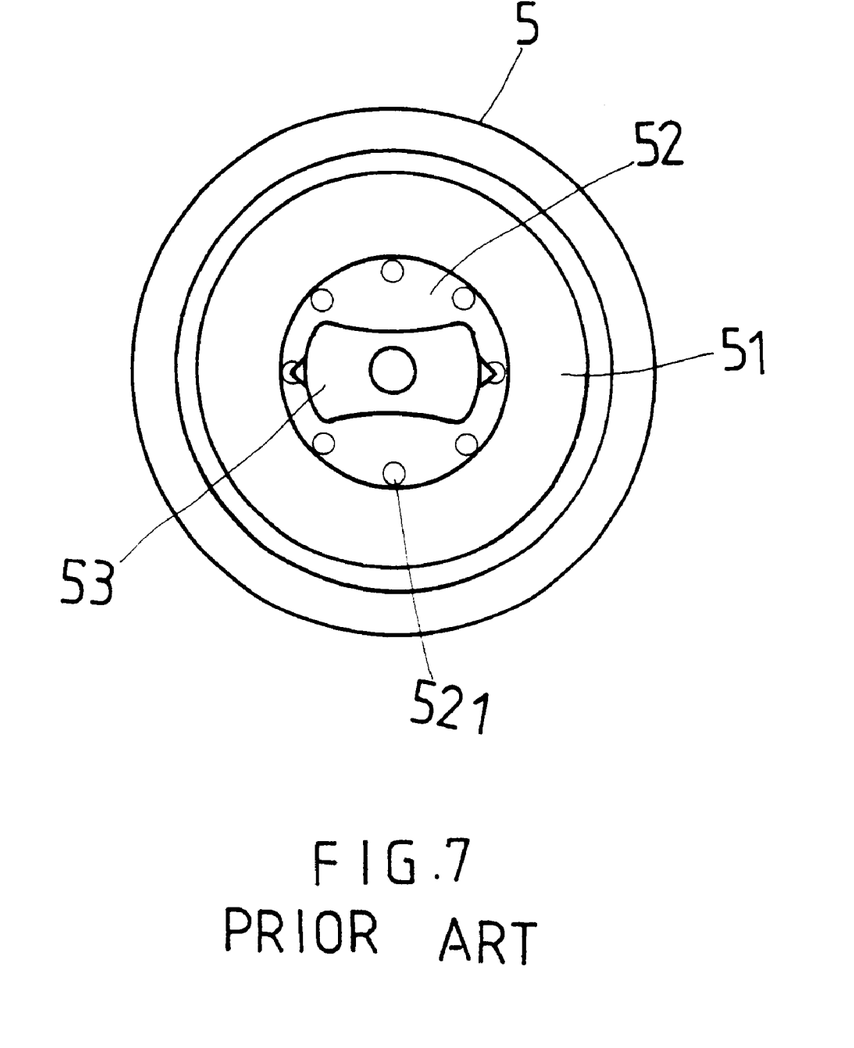
FIG. 7 is a bottom view to show a conventional pepper mill.
Figure 8:
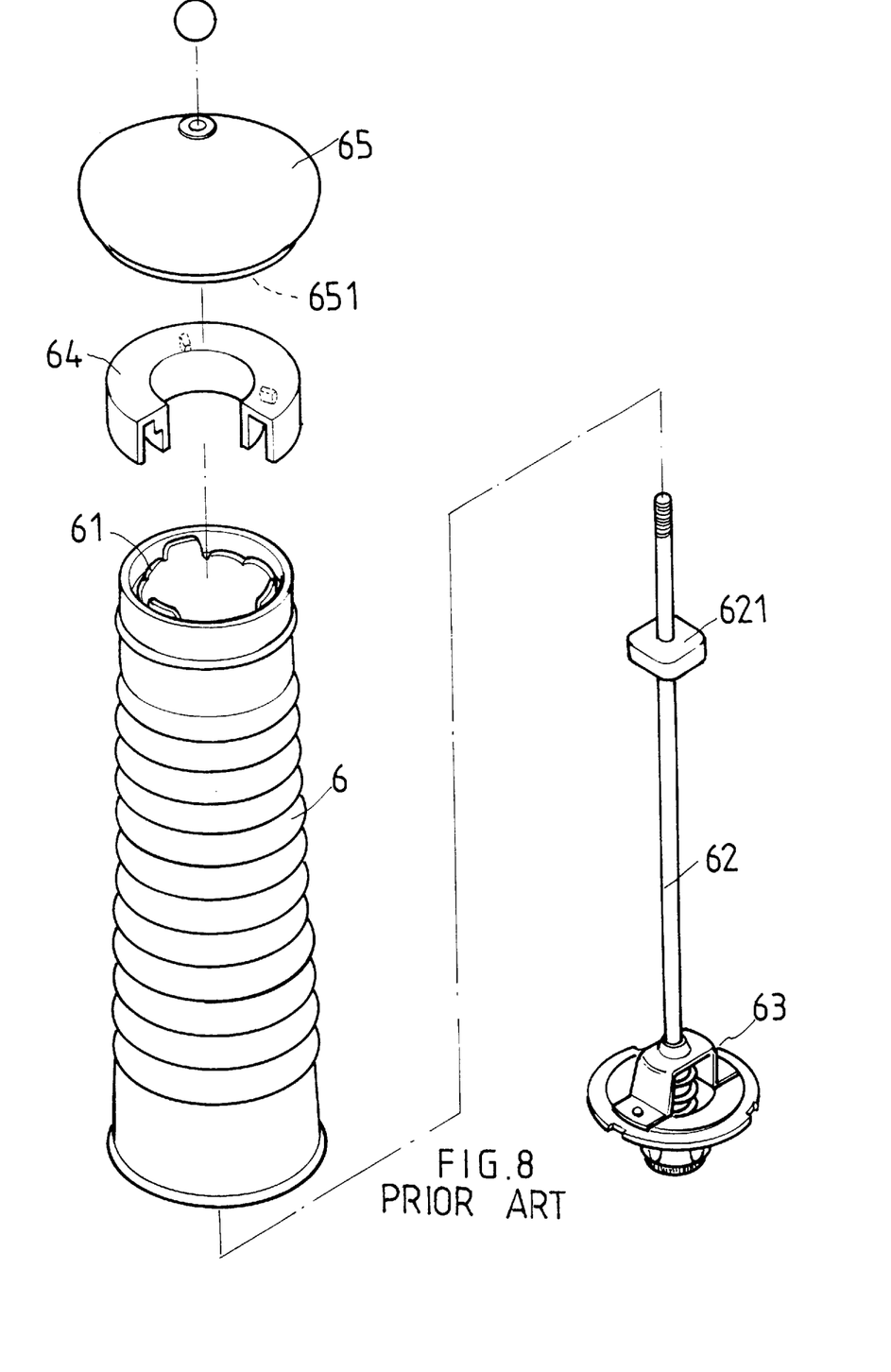
FIG. 8 is an exploded view to show another conventional pepper mill.
Figure 9:
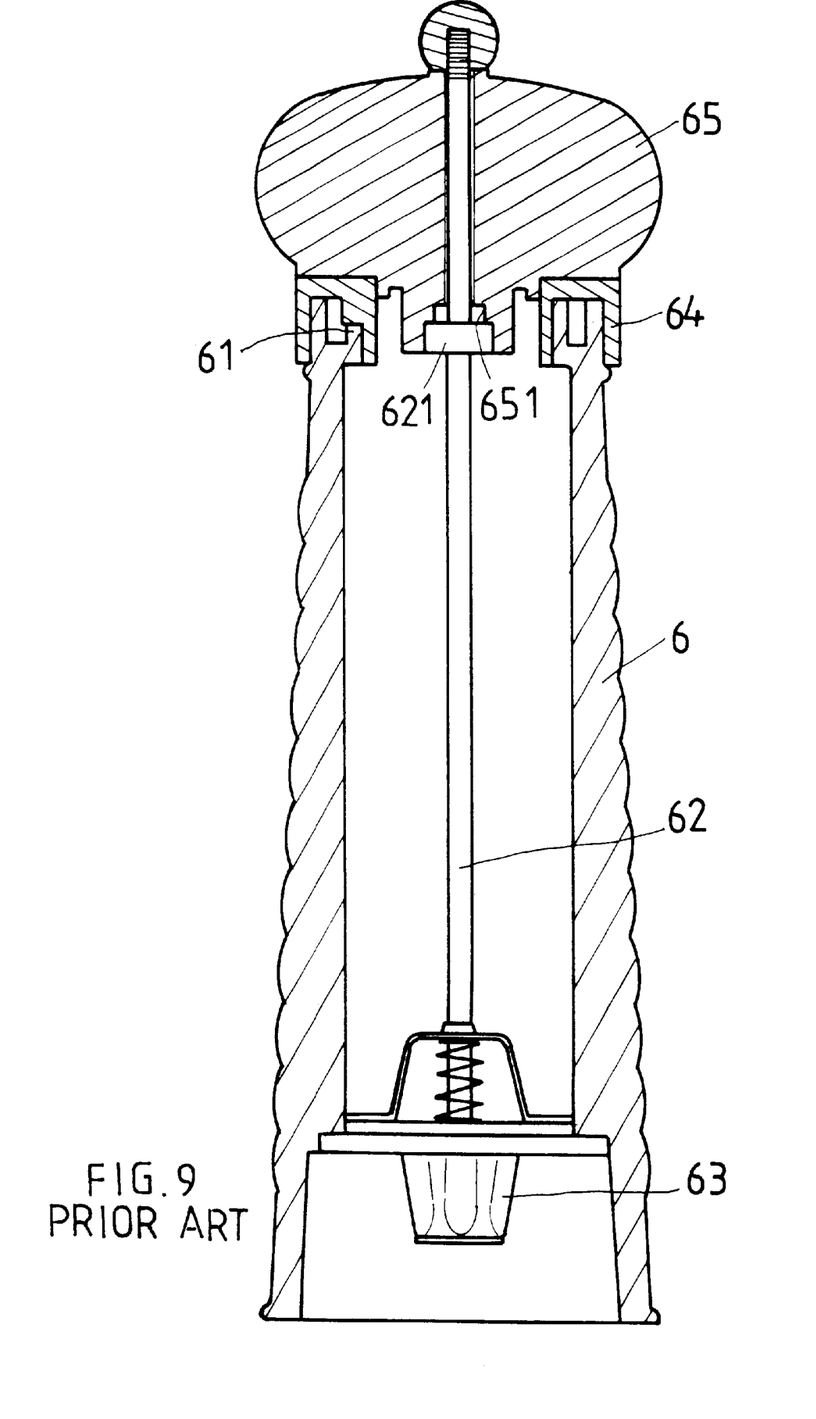
FIG. 9 is a cross sectional view to show the conventional pepper mill as shown in FIG. 8.

A conventional pepper mill 5 is shown in FIG. 7 which shows a bottom 51 of the pepper mill 5 and includes a board 52 on which marks 521 are printed for the user to rotate a plate 53 to choose the desired size of pepper particles. However, the plate 53 is so small that the users has to use their finger tips or even use their finger nails to rotate the plate 53. This is inconvenient and could hurt users finger nails. Besides, to touch the bottom 51 of the pepper mill 5 involve hygienic considerations. FIGS. 8 and 9 show another conventional pepper mill known to applicant and the pepper mill includes a bottle 6 with a serrated teeth 61 on a top edge thereof. A cap 64 is mounted to the top of the bottle 6 and has protrusions engaged with the serrated teeth 61. A cover 65 is connected to the cap 64 and a rod 62 extends from a bottom of the bottle 6. The rod 62 is fixedly connected to the cover 65 by engaging a rectangular flange 621 on the rod 62 with a rectangular recess 651 in an underside of the cover 65. A grinding device 63 is connected to the rod 62 and is engaged with a bottom of the bottle 6. When rotating the cover 65, the pepper in the bottle 6 is ground by the grinding device 63 and drops from the bottom of the bottle 6. There has no proper seal member in the bottom of the bottle 6 so that even the pepper mill is not in use, pepper still drops out from the bottom of the bottle 6. There has no options for the users to control the size of the pepper to be ground.

SUMMARY OF THE INVENTION

In accordance with one aspect of the present invention, there is provided a pepper mill and comprising a base having a first flange extending radially inward from an inner periphery of the base so that a fixed member is connected on the first flange. An end collar is connected to a bottom of the base and a second flange extends from a top the end collar. Serrated teeth are defined in a top edge of the second flange. A disk is rotatably mounted to the end collar and has openings defined therethrough. Protrusions extend radially outward from the disk and are movably engaged with the serrated teeth. The fixed member has a first grind surface defined in an inner periphery of the fixed member and a grinder is connected on the disk and located in the fixed member. The grinder has a second grinding surface on an outer periphery of the grinder.

A top member is mounted to a top of the base and a bottle is connected to the top member. The top member has a shaft which is securely engaged with the grinder and a spring is mounted to the shat and biased between the grinder and the top member.

The primary object of the present invention is to provide a pepper grinder that has an adjustable grinding device so as to have desired size of pepper particles.

The present invention will become more obvious from the following description when taken in connection with the accompanying drawings which show, for purposes of illustration only, two preferred embodiments in accordance with the present invention.

DETAILED DESCRIPTION OF THE PREFERRED EMBODIMENTS

Figure 1:
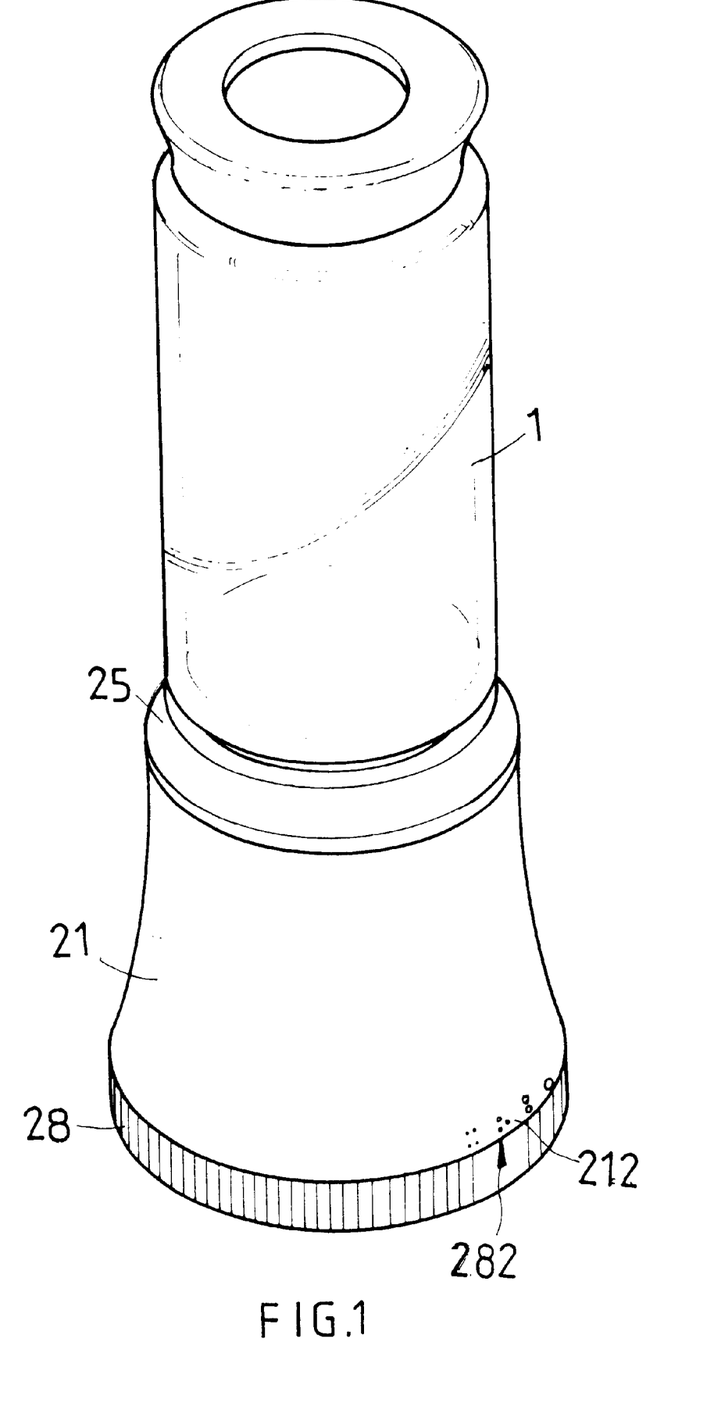
FIG. 1 is a perspective view to show the pepper mill of the present invention.
Figure 2:
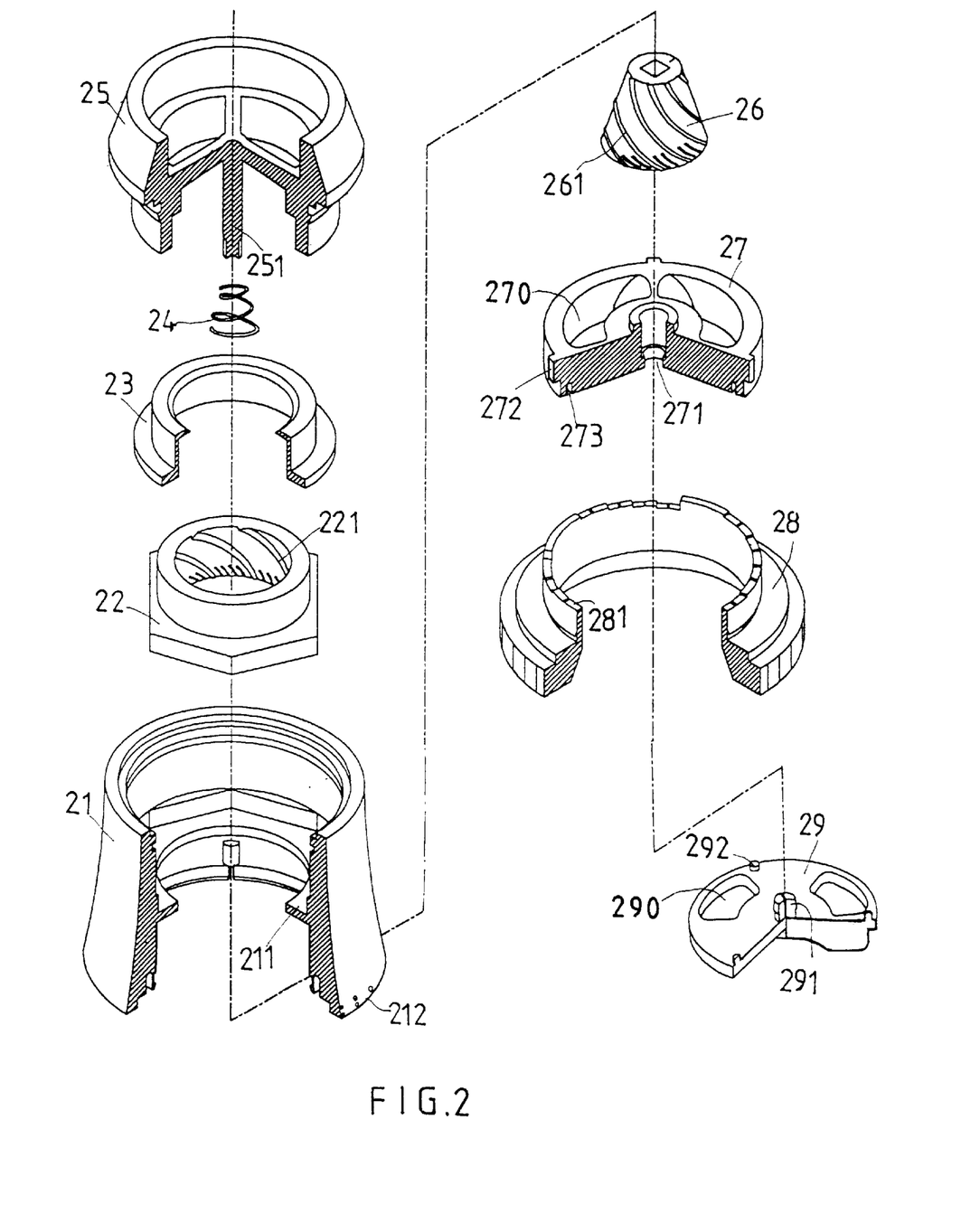
FIG. 2 is an exploded view to show the pepper mill of the present invention.
Figure 4:
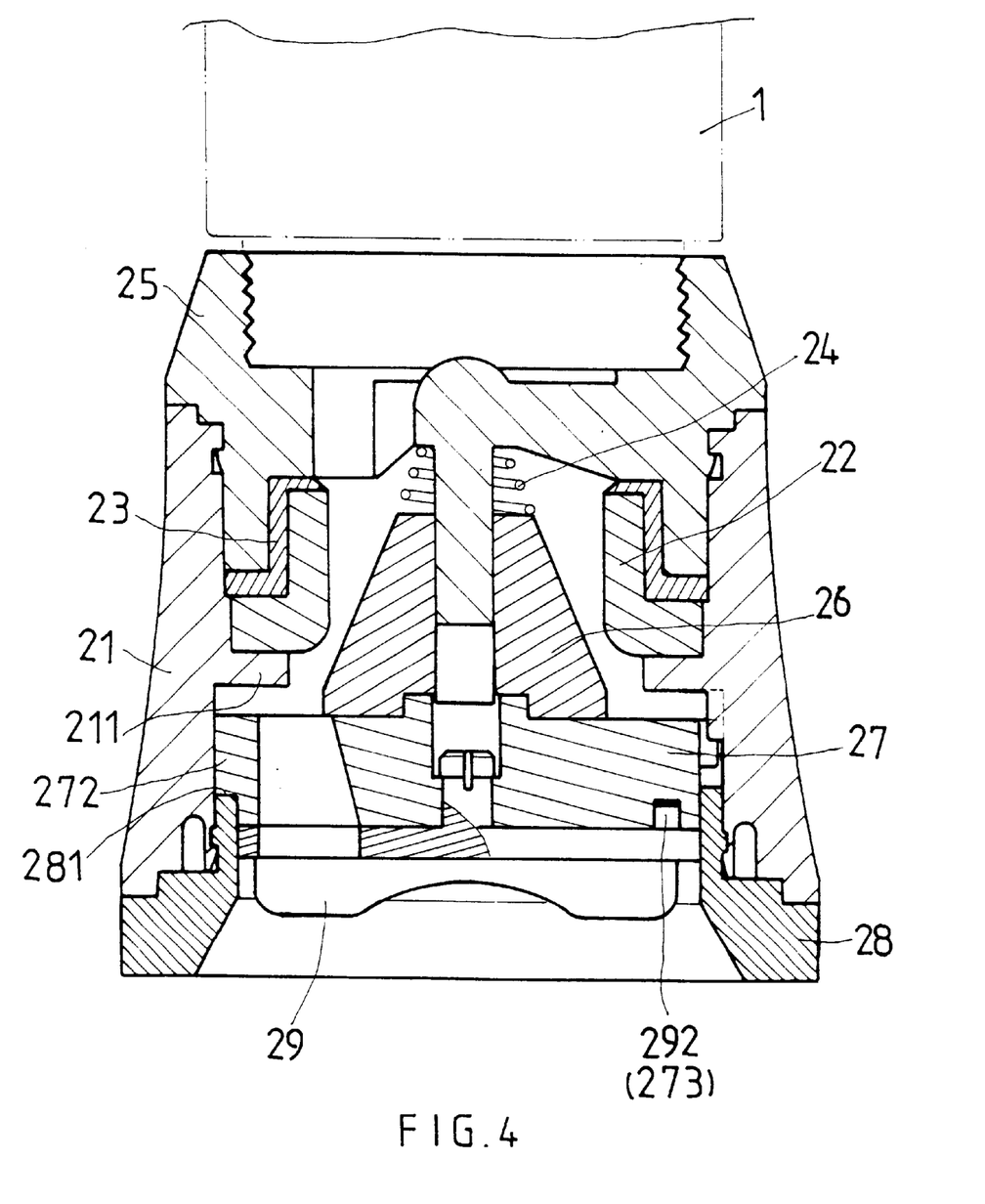
FIG. 4 is a cross sectional view to show the pepper mill of the present invention.

Referring to FIGS. 1, 2 and 4, the pepper mill of the present invention comprises a base 21 having a first flange 211 extending radially inward from an inner periphery of the base 21 and an end collar 28 is connected to a bottom of the base 21. A second flange 280 extends from a top of the end collar 28 and serrated teeth 281 are defined in a top edge of the second flange 280. A disk 27 is rotatably mounted to the end collar 28 and has openings defined therethrough. Several protrusions 272 extend radially outward from the disk 27 and are movably engaged with the serrated teeth 281. The disk 27 has grooves 273 defined in an underside thereof. An end plate 29 has a pivot 291 engaged with a central hole 271 in the disk 27 and holes 290 are defined through the end plate 29. The end plate 29 has bosses 292 extending upward from a top surface thereof and the bosses 292 are movably received in the grooves 273. The end plate 29 can be rotated to let the holes 290 communicate with the openings 270 in the disk 27 to allow ground pepper drop. Also, the end plate 29 can be rotated to seal the openings 270 to prevent the ground pepper to drop.

A fixed member 22 is supported on the first flange 211 and has a first grind surface 221 defined in an inner periphery of the fixed member 22. A grinder 26 is connected on the disk 27 and located in the fixed member 22. The grinder 26 has a second grinding surface 261 on an outer periphery of the grinder 26. A gap is defined between the first grinding surface 221 and the second grinding surface 261.

A top member 25 is mounted to a top of the base 21 with a mediate member 23 located between the top member 25 and the fixed member 22. A bottle 1 is connected to the top member 25 and the top member 25 has a shaft 251 which is securely engaged with the grinder 26 and a spring 24 is mounted to the shaft 251 and biased between the grinder 26 and the top member 25.

Figure 3:
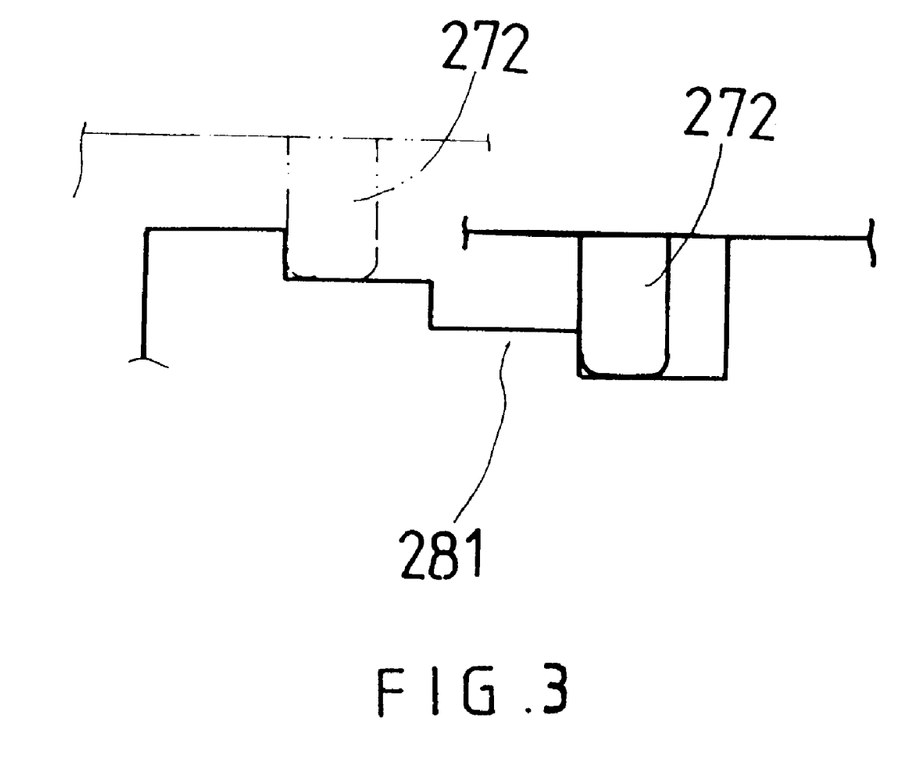
FIG. 3 shows the protrusions of the disk movable on the serrated teeth on the end collar.
Figure 5:
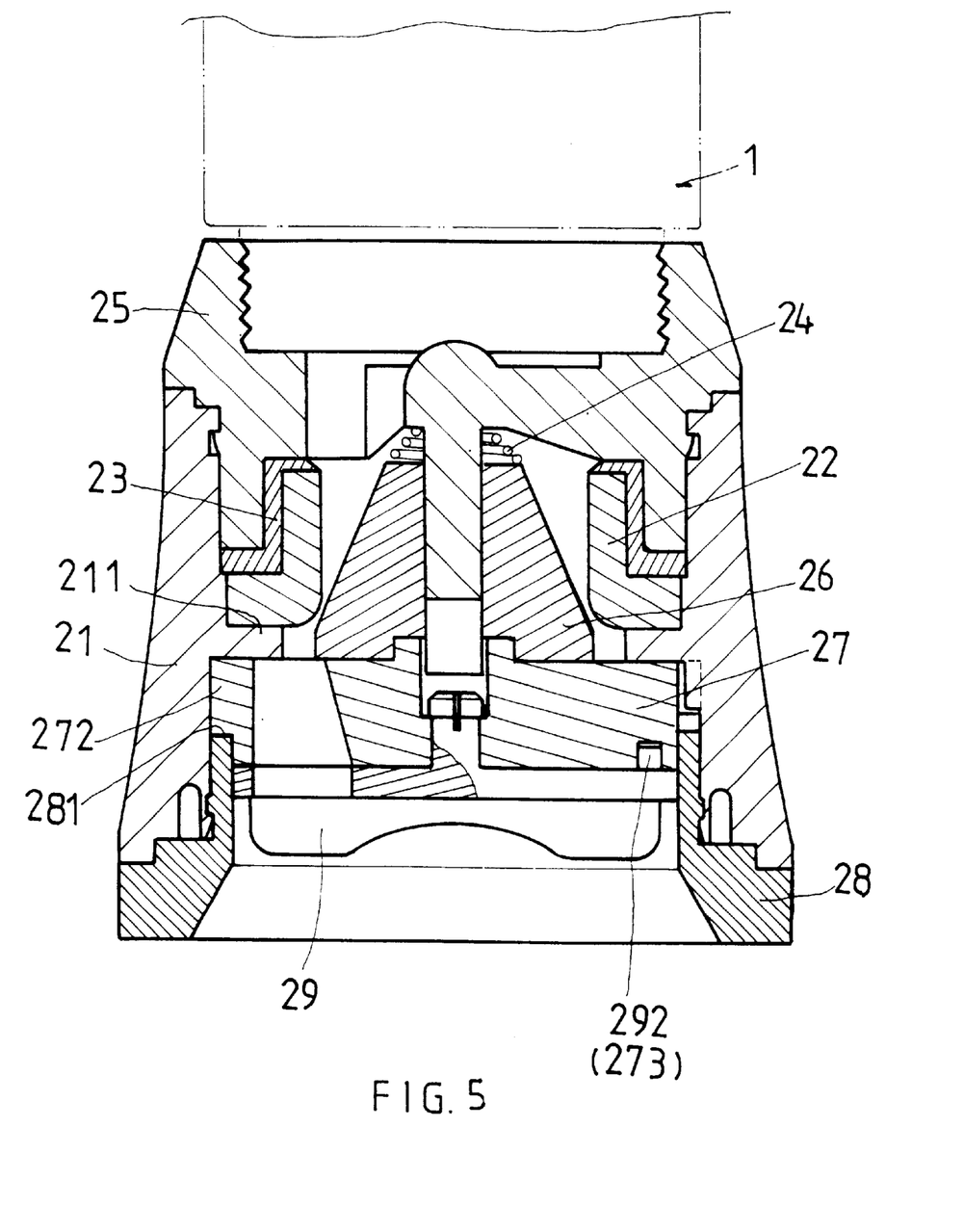
FIG. 5 is a cross sectional view to show the pepper mill of the present invention wherein the end collar is rotated.
Figure 6:
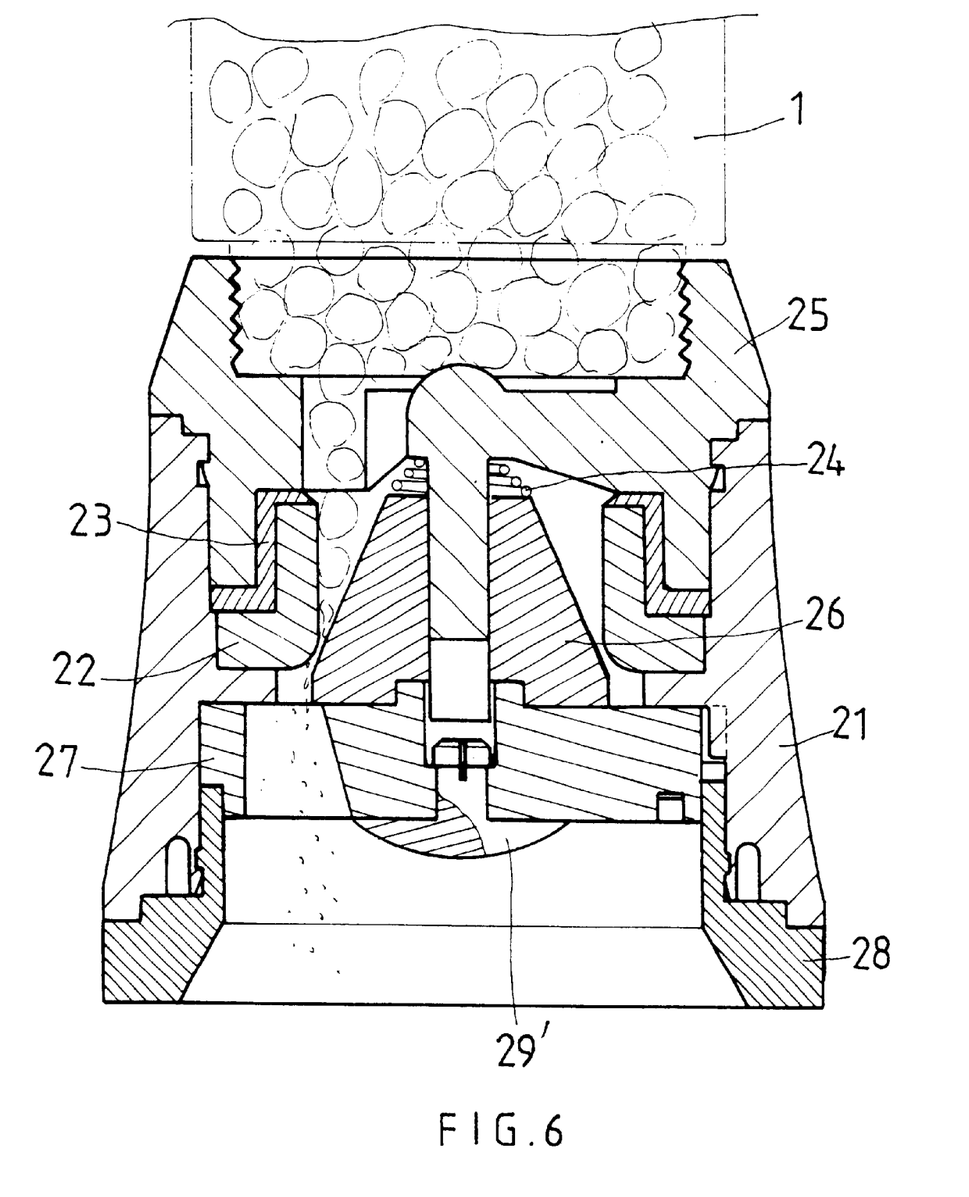
FIG. 6 is a cross sectional view to show another embodiment of the pepper mill of the present invention.

As shown in FIGS. 3 and 5, when rotating the end collar 28 to point the point mark 282 (FIG. 1) to one of the indications 212 on the base 21, the high teeth 281 on the end collar 28 push the disk 271 together with the grinder 26 upward. The gap between the first grinding surface 221 and the second grinding surface 261 is then narrowed so as to grind the pepper into fine particles. The end plate 29 can also be replaced by a smaller one 29' as shown in FIG. 6.

While we have shown and described various embodiments in accordance with the present invention, it should be clear to those skilled in the art that further embodiments may be made without departing from the scope of the present invention.

What is claimed is:

1. A pepper mill comprising:

a base having a first flange extending radially inward from an inner periphery of said base, an end collar connected to a bottom of said base and a second flange extending from a top of said end collar, serrated teeth defined in a top edge of said second flange, a disk rotatably mounted to said end collar and having openings defined therethrough, protrusions extending radially outward from said disk and movably engaged with said serrated teeth;

a fixed member supported on said first flange and having a first grind surface defined in an inner periphery of said fixed member, a grinder connected on said disk and located in said fixed member, said grinder having a second grinding surface on an outer periphery of said grinder, a gap defined between said first grinding surface and said second grinding surface, and a top member mounted to a top of said base and a bottle connected to said top member, said top member having a shaft which is securely engaged with said grinder and a spring mounted to said shaft and biased between said grinder and said top member.

2. The pepper mill as claimed in claim 1 further comprising an end plate which has a pivot engaged with a central hole in said disk, said end plate having holes which are shifted to communicate with said openings in said disk.

3. The pepper mill as claimed in claim 2, wherein said end plate has bosses extending upward from a top surface thereof and said disk has grooves defined in an underside thereof, said bosses movably received in said grooves.

* * * * *